(12) United States Patent
Nakayama

(10) Patent No.: US 12,153,841 B2
(45) Date of Patent: Nov. 26, 2024

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Hiroyoshi Nakayama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 426 days.

(21) Appl. No.: 17/406,105

(22) Filed: Aug. 19, 2021

(65) Prior Publication Data
US 2022/0300227 A1 Sep. 22, 2022

(30) Foreign Application Priority Data

Mar. 18, 2021 (JP) .................. 2021-044948

(51) Int. Cl.
| | | |
|---|---|---|
| G06K 15/00 | (2006.01) | |
| G06F 3/12 | (2006.01) | |
| H04N 1/00 | (2006.01) | |

(52) U.S. Cl.
CPC .......... *G06F 3/1257* (2013.01); *G06F 3/1208* (2013.01); *G06F 3/121* (2013.01);
(Continued)

(58) Field of Classification Search
CPC ...... G06F 3/1257; G06F 3/1208; G06F 3/121; G06F 3/1234; G06F 3/1256; G06F 3/1288; H04N 1/00814
See application file for complete search history.

(56) References Cited

U.S. PATENT DOCUMENTS

| | | | |
|---|---|---|---|
| 8,127,177 B2 | 2/2012 | Nakajima | |
| 2007/0201091 A1* | 8/2007 | Tanaka | G06F 3/1258 358/1.16 |

(Continued)

FOREIGN PATENT DOCUMENTS

| | | |
|---|---|---|
| JP | 2006011663 | 1/2006 |
| JP | 2010018004 | 1/2010 |

(Continued)

OTHER PUBLICATIONS

"Notice of Reasons for Refusal of Japan Counterpart Application", issued on Sep. 24, 2024, with English translation thereof, p. 1-p. 5.

*Primary Examiner* — Moustapha Diaby
(74) *Attorney, Agent, or Firm* — JCIPRNET

(57) ABSTRACT

An information processing apparatus includes a processor configured to store an instruction to execute a first job by using a first setting, in a case in which the first setting is changed to a second setting different from the first setting when the first job is executed, store first setting information regarding the first setting and second setting information regarding the second setting in association with each other in a storage unit, and in a case in which an instruction for execution of a second job different from the first job is given by using the first setting of the first job, perform control to display the first setting and the second setting, which are stored in the storage unit, in association with each other.

14 Claims, 12 Drawing Sheets

(52) U.S. Cl.
CPC .......... *G06F 3/1234* (2013.01); *G06F 3/1256* (2013.01); *H04N 1/00814* (2013.01); *G06F 3/1288* (2013.01)

(56) References Cited

U.S. PATENT DOCUMENTS

| | | | |
|---|---|---|---|
| 2011/0007338 A1 | 1/2011 | Kawanishi | |
| 2017/0060504 A1* | 3/2017 | Nakayama | G06F 3/1285 |
| 2017/0366691 A1* | 12/2017 | Nakayama | H04N 1/00411 |
| 2020/0293251 A1* | 9/2020 | Minami | G06F 3/1208 |

FOREIGN PATENT DOCUMENTS

| | | |
|---|---|---|
| JP | 2011018978 | 1/2011 |
| JP | 5473267 | 4/2014 |

\* cited by examiner

FIG. 8

JOB PROPERTY EDITING

| OPEN | CLOSE |

∨ SETTING
  PROCESSING OPTION
  SECURITY
  JOB INFORMATION
∨ PAPER
  INSERTION
  SPECIAL PAGE
∨ LAYOUT
  WORKING ON PAGINATED PAGE
  PAGE NUMBER
  FORM
  WATERMARK
  MEMO
∨ IMAGE QUALITY

SCREEN
NO ▶
SETTING OF OUTPUT DESTINATION
FIRST PRINTER ▶
✓ HOLD JOB AFTER PRINT COMPLETION
☐ HOLD RIP DATA
FOLDER
TAG

RANGE OF DOCUMENT PAGE
ALL PAGES ▶
RANGE OF OUTPUT PAGE
ALL PAGES ▶
BANNER SHEET
IN ACCORDANCE WITH SYSTEM SETTING ▶
☐ PRINT JOB PROPERTY SHEET
PAPER FEEDING METHOD OF BANNER SHEET AND JOB PROPERTY SHEET
IN ACCORDANCE WITH SYSTEM SETTING ▶

OK

44

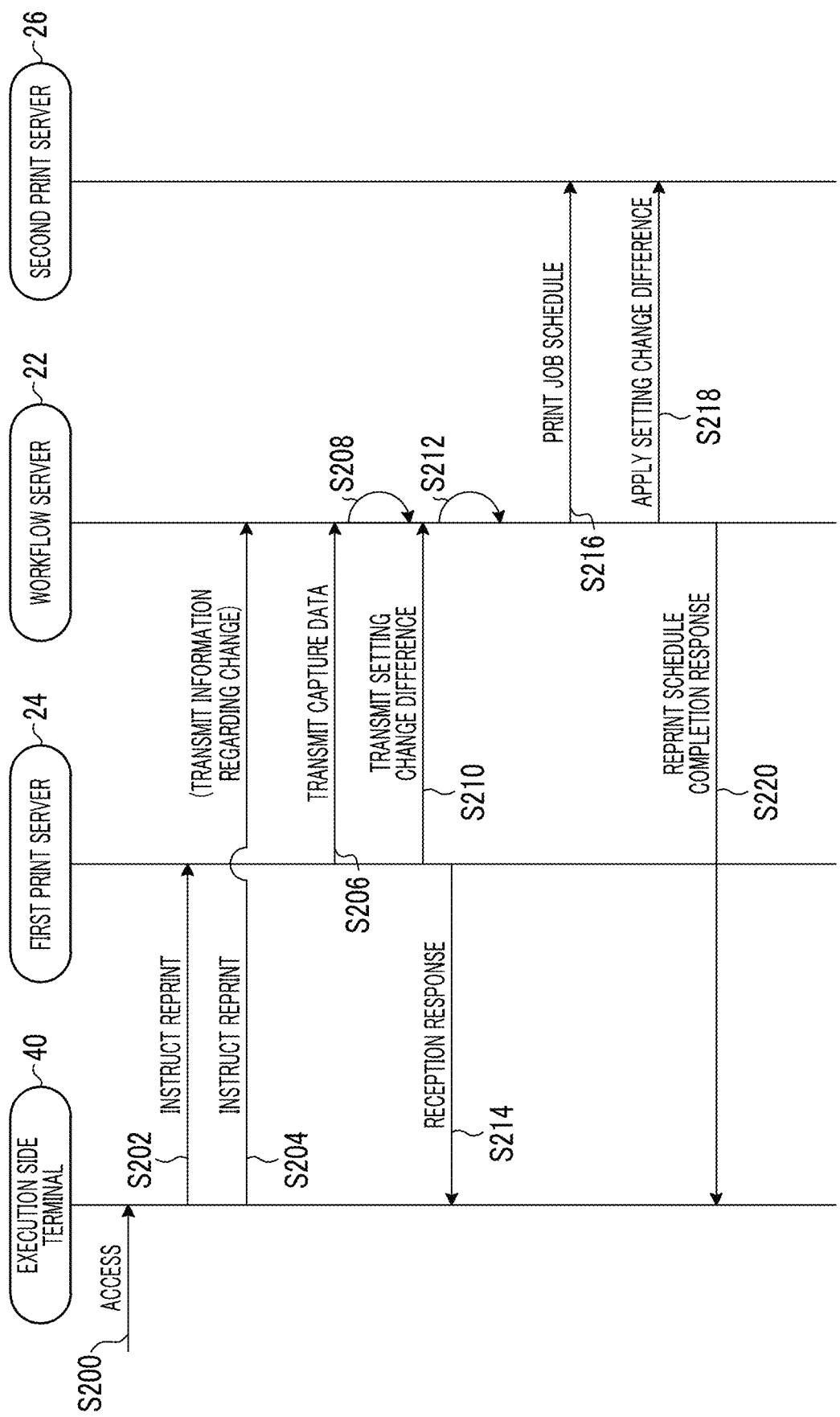

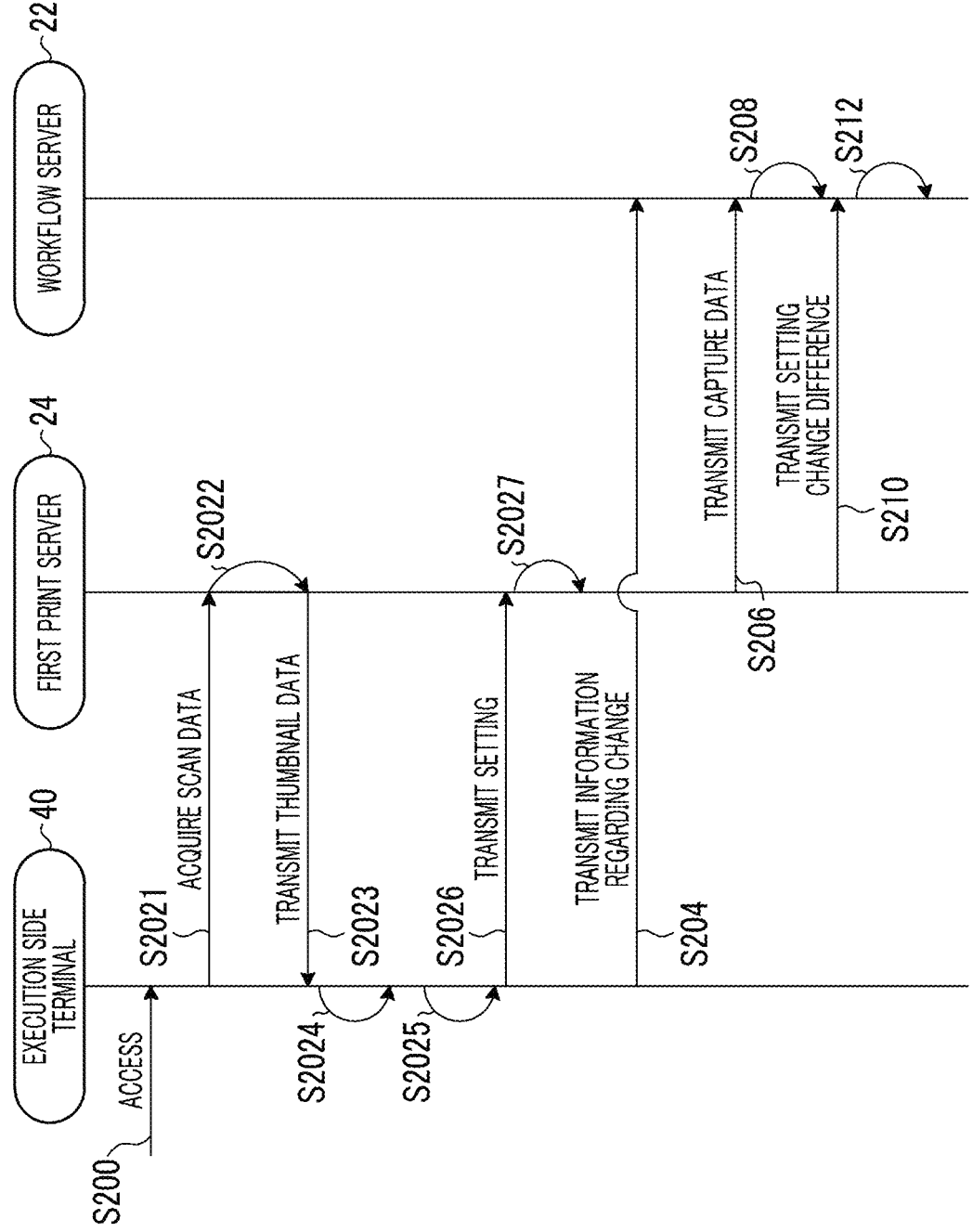

FIG. 11

FIRST PRINTER

| RECORDING DATE AND TIME | ID | SUB ID | JOB NAME | STATUS | OWNER | LOGIC PRINTER | RECEPTION START DATE AND TIME |
|---|---|---|---|---|---|---|---|
| 01/21/2021 23:30:12 | 123 | | A CORPORATION PAMPHLET | REPRINT COMPLETION | Ad | | 01/21/2021 22:15:32 |
| 11/16/2020 11:55:55 | 330 | | X CORPORATION MANUAL | REPRINT COMPLETION | Op | | 11/16/2020 10:59:39 |
| 01/21/2021 22:00:58 | 123 | | A CORPORATION PAMPHLET | PRINT COMPLETION | Ad | | 01/21/2021 15:04:32 |
| 11/16/2020 10:55:55 | 330 | | X CORPORATION MANUAL | PRINT COMPLETION | Op | | 11/16/2020 10:55:55 |
| TOTAL | | | | | | | |

THERE IS REPRINTED JOB

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2021-044948 filed Mar. 18, 2021.

BACKGROUND

(i) Technical Field

The present invention relates to an information processing apparatus, a non-transitory computer readable medium storing an information processing program, and an information processing method.

(ii) Related Art

In the related art, an information processing apparatus that executes various jobs has been known. For example, JP2010-18004A discloses a workflow execution apparatus that processes a plurality of processing processes in accordance with workflow setting information that defines the order of processing, the apparatus including a searching unit configured to, when an error has occurred in any of the processing processes, search the workflow setting information including the processing process in which the error has occurred, a device specifying unit configured to specify another device in which another processing process included in the searched workflow setting information is executed, an error occurrence notifying unit configured to notify the other device of the occurrence of the error.

Further, JP2006-11663A discloses an information processing apparatus that performs scheduling of a print job for a print device, the apparatus including a detection unit configured to detect a print job that exceeds a scheduled delivery date, and an allocation unit configured to allocate an amount of print, which exceeds the delivery date, for the print job that exceeds the delivery date detected by the detection unit to other print devices to which the print job is not allocated, the allocation unit rearranging, when another print job is allocated to the other print devices, the other print job within a range not exceeding the delivery date scheduled for the print job to allocate the amount of print, which exceeds the delivery date, to a portion vacated by the rearrangement within the range not exceeding the scheduled delivery date.

SUMMARY

By the way, a job in a workflow is executed in accordance with a preset setting. For example, a print job for which an instruction is given to execute print is executed in accordance with a print setting set when an instruction for the execution is given. When this print job is executed, another operator different from an operator who gave an instruction for the print job may execute the print job by correcting the print setting to a print setting different from the set print setting. However, in a case in which the operator who instructs the execution of the print job instructs the execution of a new print job by using a past print job, grasping a change of the print setting made by another operator is difficult. Therefore, in a case in which an instruction for the execution of the new print job is given by using the past print job, the print setting from the set print setting cannot be changed, and the printed material different from the assumption may be obtained.

Aspects of non-limiting embodiments of the present disclosure relate to an information processing apparatus, a non-transitory computer readable medium storing an information processing program, and an information processing method that, in a case in which the new job is executed by using the past job and there is a change of the past job, can present the change.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to store an instruction to execute a first job by using a first setting, in a case in which the first setting is changed to a second setting different from the first setting when the first job is executed, store first setting information regarding the first setting and second setting information regarding the second setting in association with each other in a storage unit, and in a case in which an instruction for execution of a second job different from the first job is given by using the first setting of the first job, perform control to display the first setting and the second setting, which are stored in the storage unit, in association with each other.

BRIEF DESCRIPTION OF THE DRAWINGS

Exemplary embodiment(s) of the present invention will be described in detail based on the following figures, wherein:

FIG. 8 is a diagram showing an example of the confirmation screen for the print setting;

FIG. 9 is a diagram showing an example of a flow of the information processing related to a setting change of print processing in the information processing apparatus according to the exemplary embodiment;

FIG. 10 is a diagram showing an example of a flow of processing related to the reprint instruction;

FIG. 11 is a diagram showing an example of a display screen on which a print job is displayed;

DETAILED DESCRIPTION

Hereinafter, an example of exemplary embodiments for carrying out the technique of the present disclosure will be described in detail with reference to the accompanying drawings. Note that components and processing in which operations, actions, and functions have the same effects may be given the same sign throughout all the drawings, and duplicate description may be omitted as appropriate. Each drawing is merely schematically shown enough to sufficiently understand the technique of the present disclosure. Therefore, the technique of the present disclosure is not limited to only the shown examples. Further, in the exemplary embodiments, description may be omitted for a configuration that is not directly related to the present invention or a well-known configuration.

First Exemplary Embodiment

Figure 1:
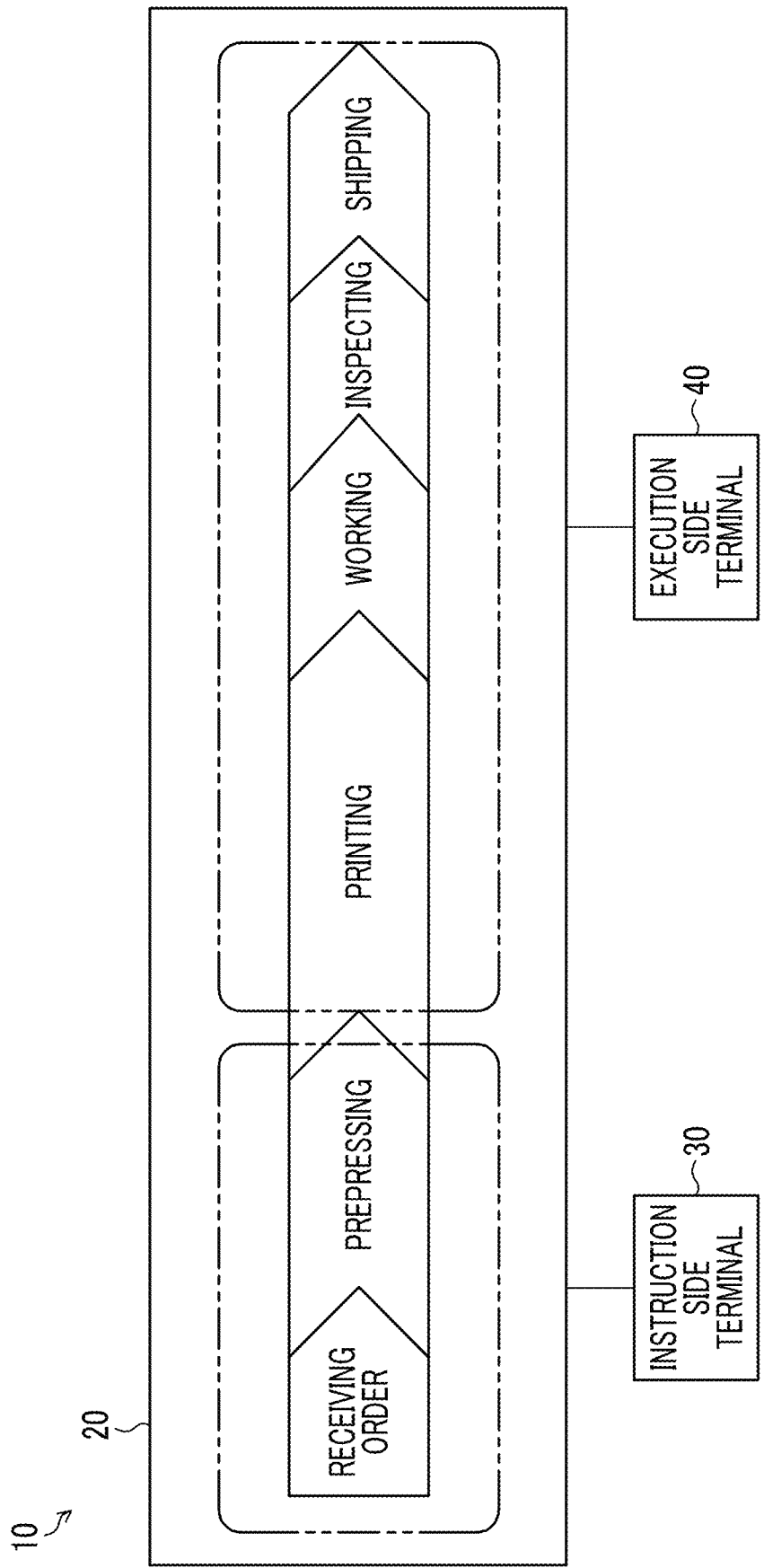
FIG. 1 is a diagram showing a schematic configuration of an information processing system according to an exemplary embodiment.

FIG. 1 is a diagram showing a schematic configuration of an information processing system 10 according to the present exemplary embodiment.

As shown in FIG. 1, the information processing system includes an information processing apparatus 20, an instruction side terminal 30, and an execution side terminal 40. These devices are connected to a network NT (FIG. 2) and can communicate with each other via the network NT. As an example, the Internet, a local area network (LAN), a wide area network (WAN), and the like are applied to this network.

The information processing apparatus 20 is a management apparatus that manages a flow of a series of processing by a job including a plurality of processes executed in accordance with a setting related to each processing. The information processing apparatus 20 manages the flow of the series of processing for processing related to an instruction document created based on data indicating an instruction of a work, which is input via the instruction side terminal 30, and processing related to the work to be executed by the created instruction document. The specific configuration and action of the information processing apparatus 20 will be described below.

In the present exemplary embodiment, as an example of the job, a case will be described in which the job includes the plurality of processes to be executed in accordance with the setting related to each processing, the job being executed in accordance with workflow information that defines order of the plurality of processes. Further, in the present exemplary embodiment, an example of an information processing system that executes information processing related to a print job including a print process of printing a printed material in the plurality of processes will be described.

The instruction side terminal 30 creates the instruction document (not shown) indicating various instructions related to the series of processing by the print job and transmits the created instruction document to the information processing apparatus 20. Examples of these various instructions include an instruction to print the printed material and an instruction to perform post-processing such as working on the printed material. Further, the instruction side terminal 30 displays various pieces of information regarding the creation of the instruction document when the instruction document is created. As an example, a general-purpose computer device, such as a server computer or a personal computer (PC), is applied to the instruction side terminal 30.

The execution side terminal 40 receives the instruction document indicating the work (for example, an instruction related to print processing), and transmits data related to the work executed in accordance with the instruction document to the information processing apparatus 20. As an example, a device including the general-purpose computer device, such as the server computer or the PC, and an image forming device having a scanning function, a printer function, a FAX function, and the like is applied to the execution side terminal 40.

Next, an outline of the information processing system 10 will be described.

The information processing system 10 is a system that performs management of executing, by the information processing apparatus 20, the information processing related to the print job including the plurality of processes including the print process of printing the printed material and storing a processing result of the executed information processing.

As shown in FIG. 1, a print task related to the manufacture of the printed material, such as a printed product, according to the exemplary embodiment includes, as major processes, receiving an order, producing a manuscript, prepressing, printing (final printing), working, inspecting, and shipping.

As an example of information processing management related to the print job, the information processing apparatus 20 manages processing of each process of (1) receiving an order, (2) prepressing, (3) printing, (4) working, (5) inspecting, and (6) shipping.

The receiving-order process is a process of receiving an order for the manufacture of the printed material from a client and producing electronic data of the manuscript for the print. The processing in the receiving-order process is performed by, for example, a proofreading management system.

The prepressing process is used as a general term for the process before printing the printed material, and may generally include processes, such as design, typesetting, composition, artwork production, color separation, retouching, weekly sales, and print plate manufacture, with respect to the received manuscript. In addition, test print may be performed as necessary and a prepressing process may be used to confirm the quality of a print result. Based on the result of this test print, the necessity of correction (proofreading) of manuscript data is determined, and in a case in which the manuscript data does not satisfy a request of the client, proofreading is performed. The processing in the prepressing process is performed by, for example, a prepress system.

The receiving-order process and the prepressing process are examples of an instruction side process executed by the instruction of the instruction side terminal 30 that instructs the manufacture of the printed material. Specifically, the receiving-order process and the prepressing process are in charge of processing of creating various pieces of data for the print that satisfy the request of the client who has requested the manufacture of the printed material, and proceed by the instruction from the instruction side terminal 30 by the operation of a worker. In the following description, the worker who performs the operation of the instruction side terminal 30 is referred to as an instructor. In a case in which the receiving-order process and the prepressing process end, the instruction document that covers various pieces of data for the print that satisfy the request of the client who has requested the manufacture of the printed material is created.

Specifically, in a case in which the result of prepressing, for example, the result of test print satisfies the request of the client, the instruction document indicating the instruction for manufacturing the printed material that satisfies the request is created and the processing proceeds to the print process.

The print process is a process of performing the print on paper or other print media based on design data for the print indicated in the instruction document. The print process can include a process of creating a print plate based on the design data for the print. In a case in which offset print is performed, the print is performed on paper or other print media by using the print plate created based on the design data for the print. Further, in a case in which digital print known as computer to plate (CTP) print is performed by a digital print device, manufacture of the print plate is not necessary. Note that the "print device" is a concept including a print machine, a printer, an image forming device, an image recording device, and the like. The processing in the print process is performed by, for example, a print system.

The working process is a process of performing various pieces of working applied to the printed material after the print or the printed material. Here, the term "working" is a general term for various pieces of working performed on the printed material that has been printed, for example. Specific examples of the working include cutting working, folding working, collating working, binding working, special working, surface working, and bookbinding working. Further, the working is not limited to one kind, and a plurality of pieces of working can be combined. Through the working process, the printed product is arranged into a book, a magazine, a pamphlet, a catalog, and other product forms. The processing in the working process is performed by, for example, a working device.

The inspecting process is a process of performing inspection as to whether or not the printed material, which has been subjected to the print process and the working process, satisfies the request of the client, that is, the printed material is the printed material manufactured in accordance with the instruction by the instruction document.

The shipping process is a process of performing shipping of the printed product including a plurality of manufactured parts to the client.

The print process to the shipping process are examples of an execution side process executed by the instruction of the work of the execution side terminal 40 that instructs the execution of the manufacture of the printed material. Specifically, the print process to the shipping process are respectively in charge of processing of instructing a work at the time of executing the print processing, a work at the time of executing the working processing, a work at the time of executing the inspecting processing, and a work at the time of executing the shipping processing, and proceed by the instruction from the execution side terminal 40 by the operation of the worker. In the following description, the worker who performs the operation of the execution side terminal 40 is referred to as an executor. In a case in which the print process to the shipping process end, the execution side terminal 40 transmits, to the instruction side terminal 30, the fact that the work in accordance with the instruction document has ended. Regarding the fact that the work in accordance with the instruction document has ended, data, such as a completion report, may be attached to the instruction document.

A workflow is used to efficiently operate and manage such a series of the print task.

Figure 2:
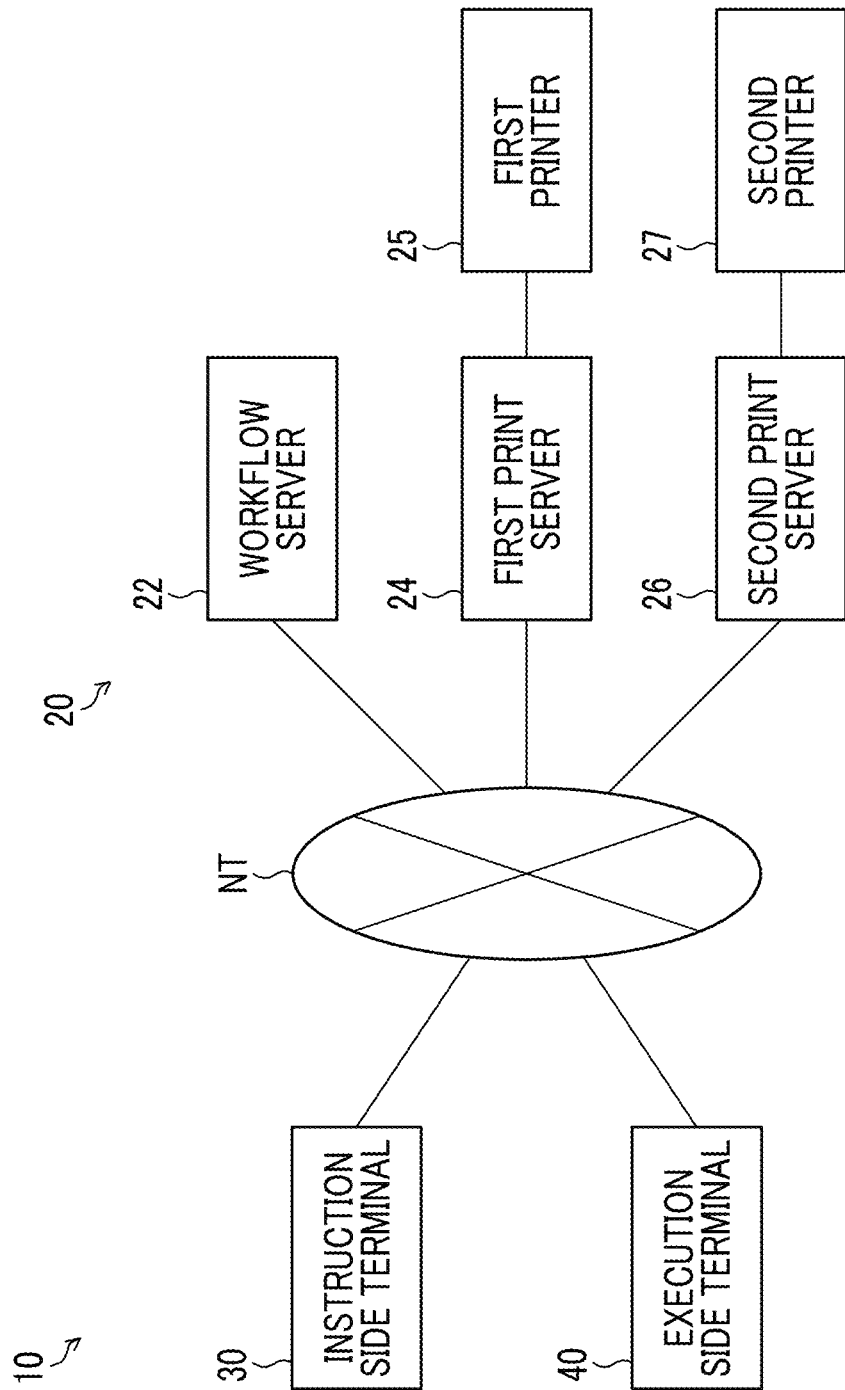
FIG. 2 is a diagram showing an example of a specific application configuration of the information processing system according to the exemplary embodiment.

FIG. 2 is a diagram showing an example of an application configuration of the information processing system 10 that performs the operation and the management of the series of the print task in accordance with the workflow according to the present exemplary embodiment.

As shown in FIG. 2, the information processing apparatus 20 includes a workflow server 22, a first print server 24, a first printer 25, a second print server 26, and a second printer 27. These devices are connected to a network NT (FIG. 2) and can communicate with each other via the network NT. In the present exemplary embodiment, the workflow server 22, the first print server 24, the first printer 25, the second print server 26, and the second printer 27 are operated in cooperation with each other to function as the information processing apparatus 20.

The workflow server 22 functions as a server that manages the workflow, and is a device that manages the order of processes and the processing in the process as the workflow for the processing of each process of receiving an order to shipping.

The first print server 24 functions as a print server (digital front end: DFE), and is a device that is connected to the first printer 25 and performs processing, such as job management, color management, and high-speed raster image processor (RIP). The first printer 25 is connected to the workflow server 22 and the like via the first print server 24. As an example, the general-purpose computer device, such as the server computer or the personal computer, is applied to the first print server 24.

The second print server 26 functions as the print server in the same manner as the first print server 24, and is a device that is connected to the second printer 27 and performs processing of supporting high productivity in the print. The second printer 27 is connected to the workflow server 22 and the like via the second print server 26. Similar to the first print server 24, the general-purpose computer device, such as the server computer or the personal computer, is applied to the second print server 26.

Note that a case will be described in which the first printer 25 and the second printer 27 have the same configuration and can be replaced with each other. Further, a case will be described in which the first print server 24 and the second print server 26 have also the same configuration.

Information Processing Apparatus

Figure 3:
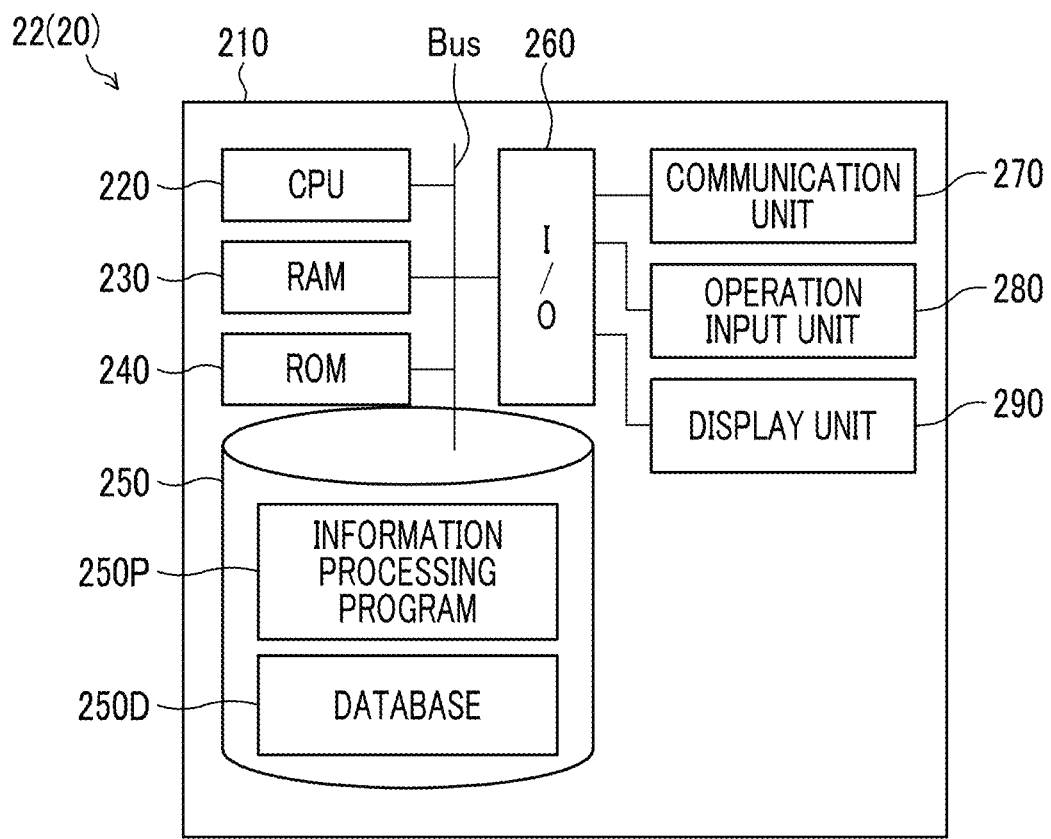
FIG. 3 is a diagram showing an example of a schematic configuration of a workflow server that configures an information processing apparatus according to the exemplary embodiment.

Next, an example of the workflow server 22 that configures the information processing apparatus 20 will be described with reference to FIG. 3. FIG. 3 is a diagram showing an example of an electrical schematic configuration of the workflow server 22 according to the present exemplary embodiment.

As shown in FIG. 3, the workflow server 22 includes a computer body 210. A computer body 210 includes a central processing unit (CPU) 220, a random access memory (RAM) 230, a read-only memory (ROM) 240, a storage unit 250, and an input/output port (I/O) 260. The CPU 220, the RAM 230, the ROM 240, the storage unit 250, and the I/O 260 are connected to each other via a bus Bus.

Further, the I/O 260 is connected with each of functional units including a communication unit 270 that enables communication with an external device, an operation input unit 280 that enables operation input by a user, and a display unit 290 that enables image display. Each of these functional units can mutually communicate with the CPU 220 via the I/O 260.

The computer body 210 may be configured as a sub control unit that controls a part of the operation of the information processing apparatus 20, or may be configured as a part of a main control unit that controls the entire operation of the information processing apparatus 20. An integrated circuit, such as a large scale integration (LSI) or an integrated circuit (IC) chipset, is used for a part or all of each block of the computer body 210. An individual circuit may be used for each block, or a circuit in which a part or all of the blocks are integrated may be used. The respective blocks may be integrally provided, or a part of the blocks may be separately provided. In addition, a part of the respective blocks may be separately provided. The computer body 210 may be integrated by using a dedicated circuit or a general-purpose processor, as well as the LSI.

An information processing program 250P that causes the information processing apparatus 20 to function as the information processing apparatus of the present disclosure is stored in the storage unit 250. The CPU 220 reads out the information processing program 250P from the storage unit 250, expands the information processing program 250P into the RAM 230, and executes the processing. As a result, the workflow server 22 that executes the information processing program 250P is operated as the information processing apparatus of the present disclosure. The information processing program 250P may be provided by a recording medium, such as a CD-ROM. Note that the specific processing of the information processing apparatus 20 including the workflow server 22 will be described below.

As the storage unit 250, for example, an auxiliary storage device, such as a hard disk drive (HDD), a solid state drive (SSD), or a flash memory, is used. The information processing program 250P for realizing the information processing according to the present exemplary embodiment is stored in the storage unit 250. The CPU 220 reads out the information processing program 250P from the storage unit 250, expands the read information processing program 250P into the RAM 230, and executes the processing. As a result, the information processing apparatus 20 that executes the information processing program 250P is operated as the information processing apparatus of the present disclosure.

The information processing program 250P may be stored in the ROM 240. Also, for example, the information processing program 250P may be installed in the information processing apparatus 20 in advance. The information processing program 250P may be realized by appropriately installing program information stored in a non-volatile storage medium or distributed via a network (not shown) in the information processing apparatus 20. Note that as an example of the non-volatile storage medium, the compact disc read only memory (CD-ROM), a magnetic-optical disc, the HDD, a digital versatile disc read only memory (DVD-ROM), the flash memory, the memory card, or the like is assumed.

Further, the storage unit 250 also stores a database (DB) 250D that accumulates data that can be used by the information processing apparatus 20. The database 250D is not limited to be stored in the storage unit 250. For example, the database 250D may be stored in an external device (not shown) and inquired or written to the external device (not shown) via a communication line.

The communication unit 270 is connected to a communication network, and is configured to enable communication between the workflow server 22 and the external device. The "communication network" is a concept including a network that enables data transfer between devices via the communication line by at least one connection of a wired connection or a wireless connection. For example, a narrow area communication network (for example, local area network: LAN) that enables the data transfer at a base of a company, and a wide area communication network (for example, wide area network: WAN), such as the Internet, that enables the data transfer via a public communication line.

The operation input unit 280 is provided with a device for operation input, such as a keyboard or a mouse.

As the display unit 290, for example, a liquid crystal display (LCD), an organic electro luminescence (EL) display, or the like is used. As the display unit 290, a touch panel having a function of the operation input unit 280 may be applied. The operation input unit 280 receives various instructions from the user. The display unit 290 displays various pieces of information, such as a result of the executed processing and notification of the processing.

Note that the electrical configurations of the first print server 24 and the second print server 26 are substantially the same as the electrical configuration of the workflow server 22, and thus the description thereof will be omitted. Also, the configurations of the instruction side terminal 30 and the execution side terminal 40 are the same, and thus the description thereof will be omitted.

Figure 4:
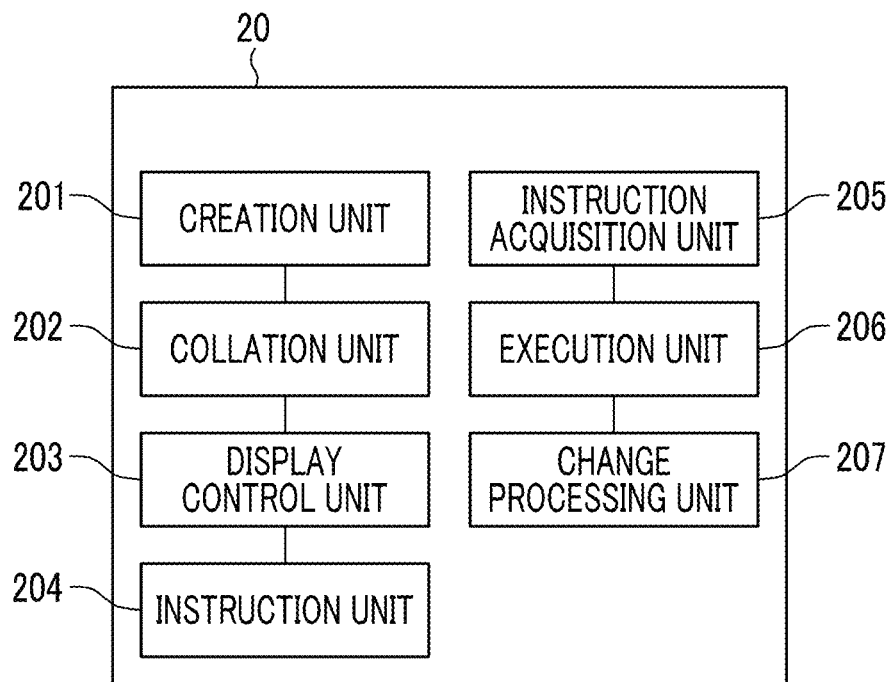
FIG. 4 is a diagram showing an example of a functional configuration of the information processing apparatus according to the exemplary embodiment.

FIG. 4 is a diagram showing an example of a functional configuration of the information processing apparatus 20 according to the present exemplary embodiment.

The information processing apparatus 20 according to the present exemplary embodiment functions as the information processing apparatus of the present disclosure by executing information processing by the workflow server 22, executing information processing by the first print server 24, and executing information processing by the second print server 26. As shown in FIG. 4, the information processing apparatus 20 includes functional units that respectively function as a creation unit 201, a collation unit 202, a display control unit 203, an instruction unit 204, an instruction acquisition unit 205, an execution unit 206, and a change processing unit 207.

The creation unit 201 is a functional unit having a function of creating the instruction document related to the print job. Note that the print job is executed in accordance with the setting related to each processing. Further, note that the print job includes the plurality of processes including the print process and is executed in accordance with the workflow information that defines the order of the plurality of processes. The creation unit 201 creates the instruction document including information indicating the setting and the like related to the processing in the print job. The instruction document related to the print job is created by, for example, the operation of the instruction side terminal 30 by the instructor and is registered in, for example, the database 250D.

The collation unit 202 is a functional unit having a function of collating the print job to be executed and the print job that has been executed. The collation unit 202 has a function of collating the information indicating the setting and the like related to the processing in the print job to be executed with the information indicating the setting and the like related to the processing in the print job that has been executed. The collation unit 202 collates the information indicating the setting related to the processing in the print job indicated by the created instruction document with, for example, the information indicating the setting registered in the database 250D. In the following description, the print job to be executed is referred to as a new print job, and the print job that has been already executed is referred to as an existing print job. The collation unit 202 has a function of collating the setting related to each processing in the new print job with the setting related to each processing in the existing print job. The collation unit 202 has a function of determining whether or not at least a part of the setting of the existing print job is used for the new print job.

The display control unit 203 is a functional unit that performs control of displaying a collation result between the new print job and the existing print job. The display control unit 203 performs control of displaying the information indicating whether or not at least a part of the setting of the existing print job is used for the new print job. For example, in a case in which a part of the setting of the existing print job is used for the new print job, the display control unit 203 performs control of displaying the collation result by transmitting the information to the instruction side terminal 30 such that the information regarding the use is displayed on a display unit of the instruction side terminal 30. Further, for example, in a case in which the existing print job setting is not used for the new print job, the display control unit 203 transmits the information to the instruction side terminal 30 such that the information indicating that the setting is not used is displayed on the display unit of the instruction side terminal 30.

The instruction unit 204 is a functional unit having a function of performing the instruction to execute the print job in accordance with the created instruction document. The instruction unit 204 instructs the execution of the print job in accordance with the setting of the processing in the print job. For example, the instruction unit 204 transmits the created instruction document to the execution side terminal 40.

The instruction acquisition unit 205 is a functional unit having a function of acquiring the information regarding the print job to be executed. The instruction acquisition unit 205 acquires the instruction document regarding the print job to be executed. For example, the instruction acquisition unit 205 acquires the created instruction document (for example, the instruction document registered in the database 250D in this case) and transmits the acquired instruction document to the execution side terminal 40.

The execution unit 206 is a functional unit having a function of executing the print job in accordance with the acquired instruction document. For example, the print job is executed in accordance with the instruction document related to the print job by the operation of the execution side terminal 40 by the executor.

The change processing unit 207 is a functional unit having a function of performing the processing related to a change of a part of the setting of the print job when the print job is executed. The change processing unit 207 has, for example, a function of extracting, in a case in which a part of the setting of the print job is changed when the print job is executed, information indicating the changed setting. For example, in a case in which the setting of the print job is changed by the operation of the execution side terminal 40 by the executor when the print job is executed, the processing of extracting the information indicating the changed setting is performed. In addition, the change processing unit 207 has a function of registering the extracted information indicating the changed setting in the database. In a case in which the information indicating the changed setting of the print job is extracted, the change processing unit 207 can execute the processing of registering the extracted information indicating the setting (changed-setting information) in, for example, the database 250D.

The creation unit 201, the collation unit 202, the display control unit 203, and the instruction unit 204 described above are examples of the functional units in the information processing apparatus 20, which execute the instruction side process. Further, the instruction acquisition unit 205, the execution unit 206, and the change processing unit 207 are examples of the functional units in the information processing apparatus 20, which execute the execution side process.

Next, the action of the information processing apparatus 20 according to the present exemplary embodiment will be described.

In the present exemplary embodiment, as an example of the information processing, a case will be described in which the instructor operates the instruction side terminal 30 to execute the instruction side process of creating the instruction document related to the print job and the executor operates the execution side terminal 40 to execute the execution side process of manufacturing the printed material in accordance with the print job.

For example, in a case in which the worker (instructor) who instructs the print job and the worker (executor) who executes the print process in the print job are different from each other, the executor may correct the print setting set by the instructor to a different print setting and execute the print job. However, in a case in which the identical or another instructor instructs the execution of the new print job by using a part of the setting of the existing print job, grasping the change of the print setting performed by the executor is difficult. Therefore, in a case in which an instruction for the execution of the new print job is given by using the existing print job, a print setting from the set print setting cannot be used, and the printed material different from the assumption may be obtained.

Therefore, according to the present exemplary embodiment, in a case in which the new job is executed by using the existing job, the information processing apparatus that presents the change in a case in which the setting of the existing job is changed is provided.

Next, the information processing to be executed by the information processing apparatus 20 according to the present exemplary embodiment will be described. In the present exemplary embodiment, the information processing related to the print job will be described focusing on the print processing in the print process of printing the printed material, which is defined by the workflow.

Figure 5:
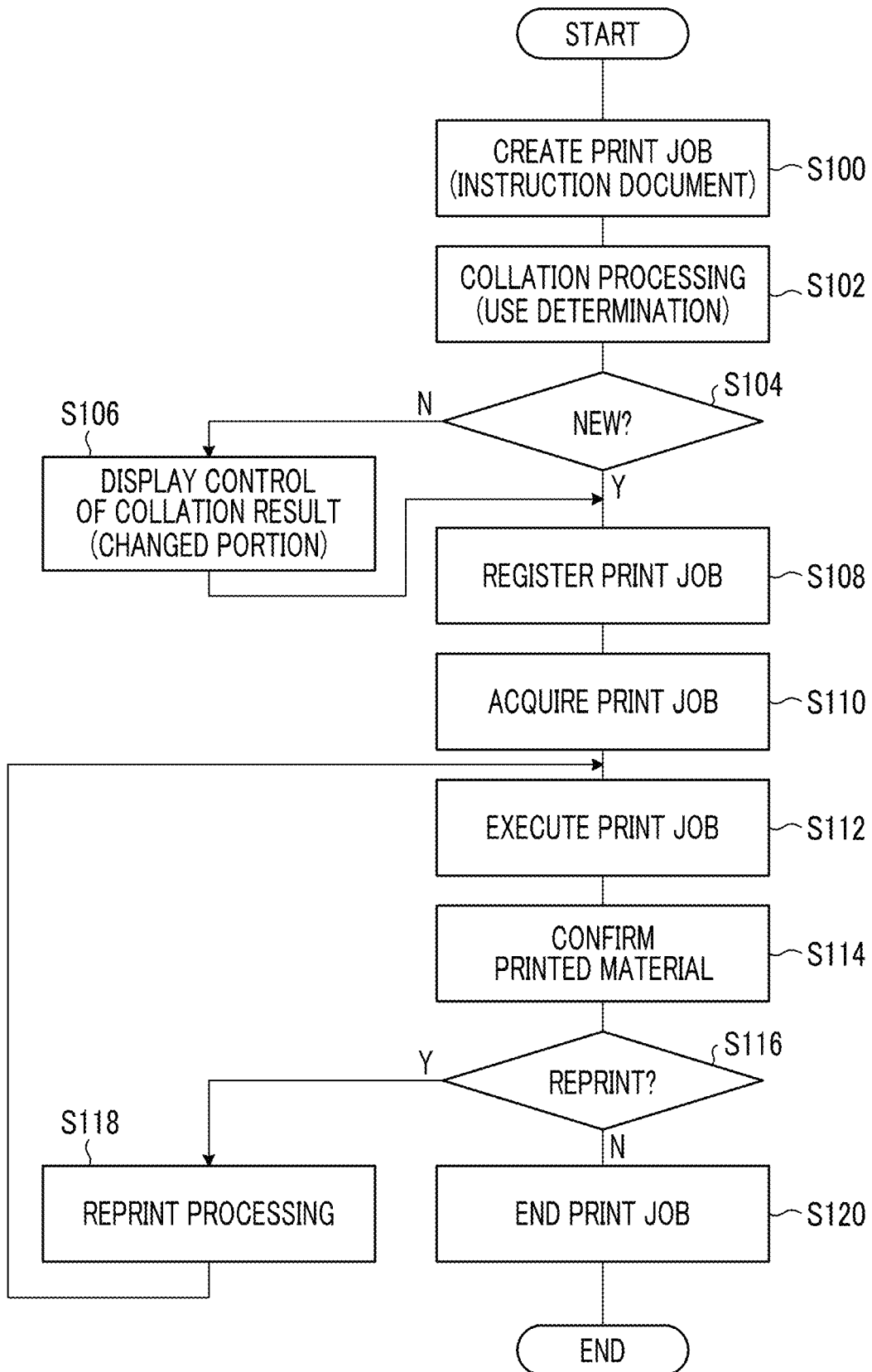
FIG. 5 is a flowchart showing an example of a flow of information processing to be executed by the information processing apparatus according to the exemplary embodiment.

FIG. 5 is a flowchart showing an example of a flow of the information processing to be executed by the information processing apparatus 20.

In a case in which an instruction for the start of the print job is given by the instruction side terminal 30, the information processing apparatus 20 executes the information processing related to the print job. In the present exemplary embodiment, a case will be described, as an example, in which the information processing proceeds centering on the workflow server 22.

Creation and Execution of New Job

First, a series of processing of creating the new print job, that is, creating the instruction document regarding the print job without using the existing print job and performing the print in accordance with the created instruction document will be described. Here, a series of information processing of the print job to be printed will be described in which an instruction document in which a new print setting related to the print is defined is created in a case in which the new print job is created and the print is performed in accordance with the information regarding the print setting indicated in the instruction document.

In step S100, the information processing apparatus 20 executes processing of creating the print job, that is, creating the instruction document related to the print job. Specifically, the CPU 220 of the workflow server 22 defines the workflow of the print job by the operation of the instruction side terminal 30, and creates the instruction document in which the information indicating the print setting in the print process of the workflow is defined. The processing in step S100 is an example of the function of the creation unit 201 shown in FIG. 4.

In step S102, the print job in accordance with the created instruction document is collated with the existing print job. Specifically, the information indicating the print setting of the print process in the print job indicated by the created instruction document and the information indicating the print setting of the print process in the print job indicated by the instruction document registered in the database 250D are collated, and the collation result is acquired. Here, the existing print job is not used for the new print job, the collation result indicates the new print job that does not use the existing print job.

In step S104, a determination is made as to whether or not the collation result in step S102 indicates the new job. Since the collation result indicates the new print job as described above, a positive determination is made in step S104, and the processing proceeds to step S108. The processing in step S102 and step S104 is an example of the function of the collation unit 202 shown in FIG. 4.

In step S108, the created instruction document is registered in the database 250D. Note that when the created instruction document is registered in the database 250D, information indicating that the instruction document is registered in the database 250D may be transmitted to the execution side terminal 40 in order to notify the executor. As a result, the execution of the print job created by the instructor can be started. The processing in step S108 is an example of the function of the instruction unit 204 shown in FIG. 4.

Next, at least the print process of the workflow is executed in accordance with the workflow of the print job by the operation of the execution side terminal 40.

The information processing apparatus 20 acquires the print job in step S110. Specifically, the CPU 220 of the workflow server 22 specifies the workflow of the print job for which an instruction is given by the operation of the execution side terminal 40, and acquires the instruction document regarding the specified print job. The processing in step S108 is an example of the function of the instruction acquisition unit 205 shown in FIG. 4.

In step S112, the print job is executed in accordance with the acquired instruction document. Specifically, the instruction is performed to execute the processing of the print process in accordance with the information indicating the print setting of the print process in the print job indicated by the created instruction document. Here, in step S112, the print job is the new print job, and thus the executor does not change the print setting of the print process in the print job indicated by the created instruction document, and the processing proceeds.

In step S114, processing of confirming the printed material created in accordance with the print setting is performed. For example, the executor performs a determination processing of determining whether or not the printed material created in accordance with the print setting is an appropriate printed material. This appropriate printed material is the printed material, which has been printed, in accordance with the print setting of the print process in accordance with the created instruction document. In addition, in the determination processing, a determination can be made based on a result of confirmation as to whether or not the printed material is the printed material in accordance with the print setting of the print process in accordance with the created instruction document, from a visual observation by the executor or a measurement result by a measurement device (not shown). In a case in which, as a result of determination, a determination is made that the printed material is not the appropriate printed material, the executor can instruct reprint. The processing in steps S112 and S114 is an example of the function of the execution unit 206 shown in FIG. 4.

In step S116, a determination is made as to whether or not to reprint the print job. That is, in a case in which, based on the determination result in step S114, the result of confirmation indicates that the printed material is the appropriate printed material, the reprint is unnecessary, a negative determination is made in step S116, information indicating that the print job has ended in step S120 is registered in the database 250D, and the processing routine ends. On the other hand, in a case in which an instruction for the reprint is given, a positive determination is made in step S116, and the processing proceeds to step S118.

In step S118, reprint processing of the print job is executed. As a result of confirming the printed material, the executor may determine to correct the print setting set by the instructor to a different print setting and re-execute the print job (step S114). In this case, a positive determination is made in step S116, and the reprint processing of step S118 is executed. The reprint processing includes processing of correcting the print setting to a print setting different from the print setting set by the instructor and re-executing the print job. In the present exemplary embodiment, the information processing related to the reprint in a case in which the print setting is changed, by the executor, with respect to the print setting for which an instruction is given by the instructor will be described.

In step S118, the information processing apparatus 20 first extracts information regarding a change with respect to the execution processing in step S112. Specifically, the information regarding the change made by the executor by the operation of the execution side terminal 40 with respect to the print setting of the print process in the print job indicated by the instruction document registered in the database 250D, that is, the information indicating a changed print setting is extracted. Then, the extracted information, that is, the information regarding the change, which is the information indicating the changed print setting, is registered. Specifically, the information indicating the print setting changed by the executor is registered in the database 250D in association with the information indicating the print setting before the change. This information regarding the change can include information indicating a reason why the print setting is changed by the executor. The processing in step S118 is an example of the function of the change processing unit 207 shown in FIG. 4.

Then, the processing is returned to step S112, and the print processing (print job) is executed in accordance with the changed print setting. That is, the processing in accordance with the instruction (print instruction or reprint instruction) partially changed by the executor is executed.

In this way, in a case in which the print setting of the print processing for which an instruction is given by the instructor is changed by the executor, the information indicating the print setting by the instructor and the information indicating the print setting changed by the executor are registered in association with each other in the database 250D.

Figure 6:
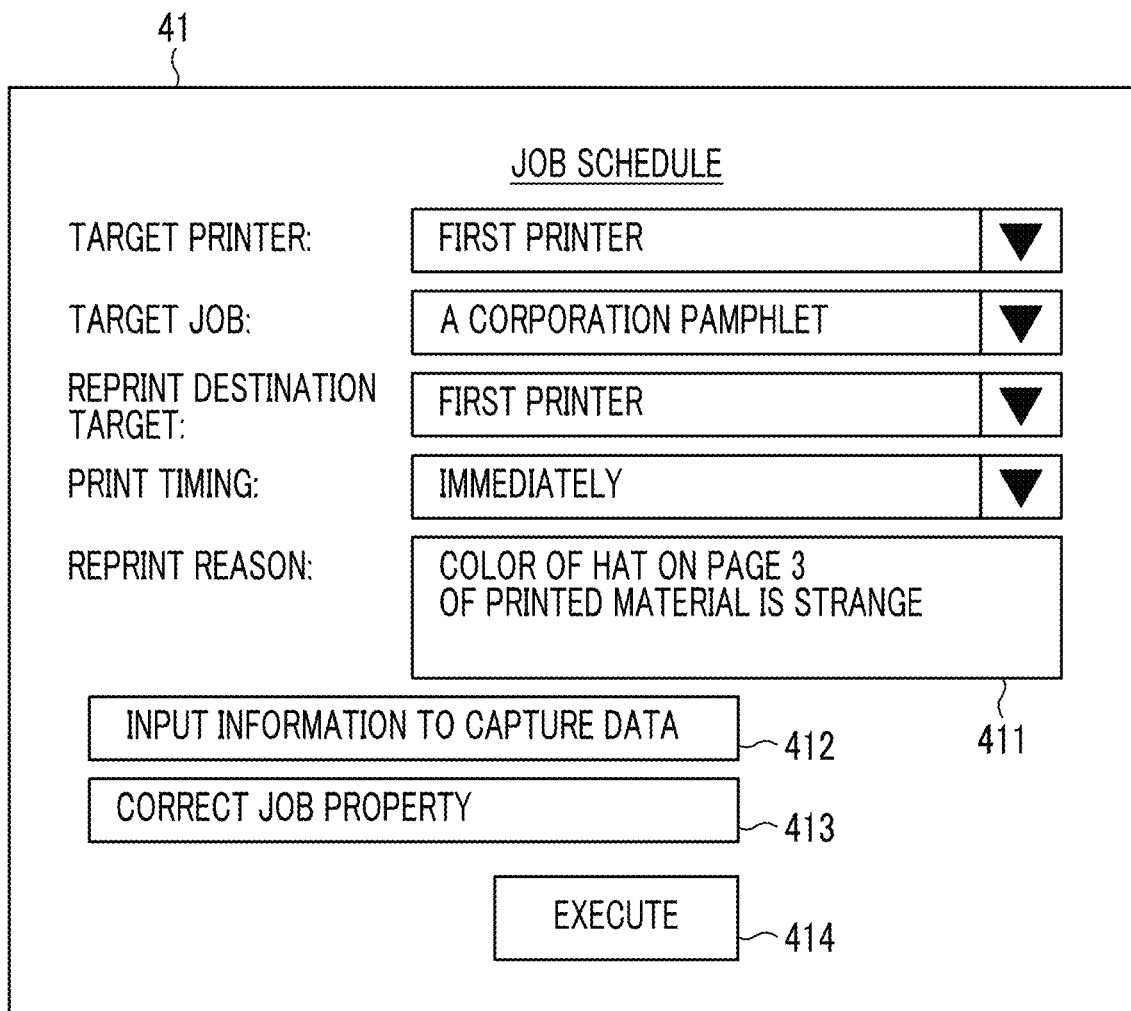
FIG. 6 is a diagram showing an example of a screen displayed at the time of a reprint instruction.

The setting change of the print processing described above will be further described with reference to FIGS. 6 to 11. FIG. 6 is a diagram showing a reprint instruction screen 41 as an example of the screen of the execution side terminal 40 in a case in which an instruction for the reprint is given.

As shown in FIG. 6, the reprint instruction screen 41 includes a display region in which various pieces of information for executing the reprint are displayed. Specifically, the reprint instruction screen 41 includes a display region in which each information on a target printer, a target job, a reprint destination target, the print timing, and a reprint reason is displayed as a target item for executing the reprint. The target printer indicates a printer that has printed the printed material previous time, and the target job indicates a target print job for which the reprint is to be executed. The reprint destination target indicates a printer which is to execute the reprint, and the print timing indicates the time when the reprint is executed. The reprint reason indicates a reason why the reprint is executed, and information indicating the content of the reason is input to an input region 411. These pieces of information are instructed or input by the operation of the execution side terminal 40 by the executor.

Also, the reprint instruction screen 41 includes an instruction button 412, an instruction button 413, and an instruction button 414. The instruction button 412 is an instruction button for instructing the input of the information regarding the change to capture data, for the print job to be reprinted. The capture data indicates data of a page to be changed for scan data obtained by scanning, by an image reading device (not shown), the printed material printed in accordance with the set print setting. The instruction button 413 is an instruction button for instructing the input of information to be changed with respect to the setting in the print job to be reprinted, that is, the print setting of the print processing in the print process. The instruction button 414 is an instruction button for instructing the execution of the reprint after the processing related to the change described above ends.

Figure 7:
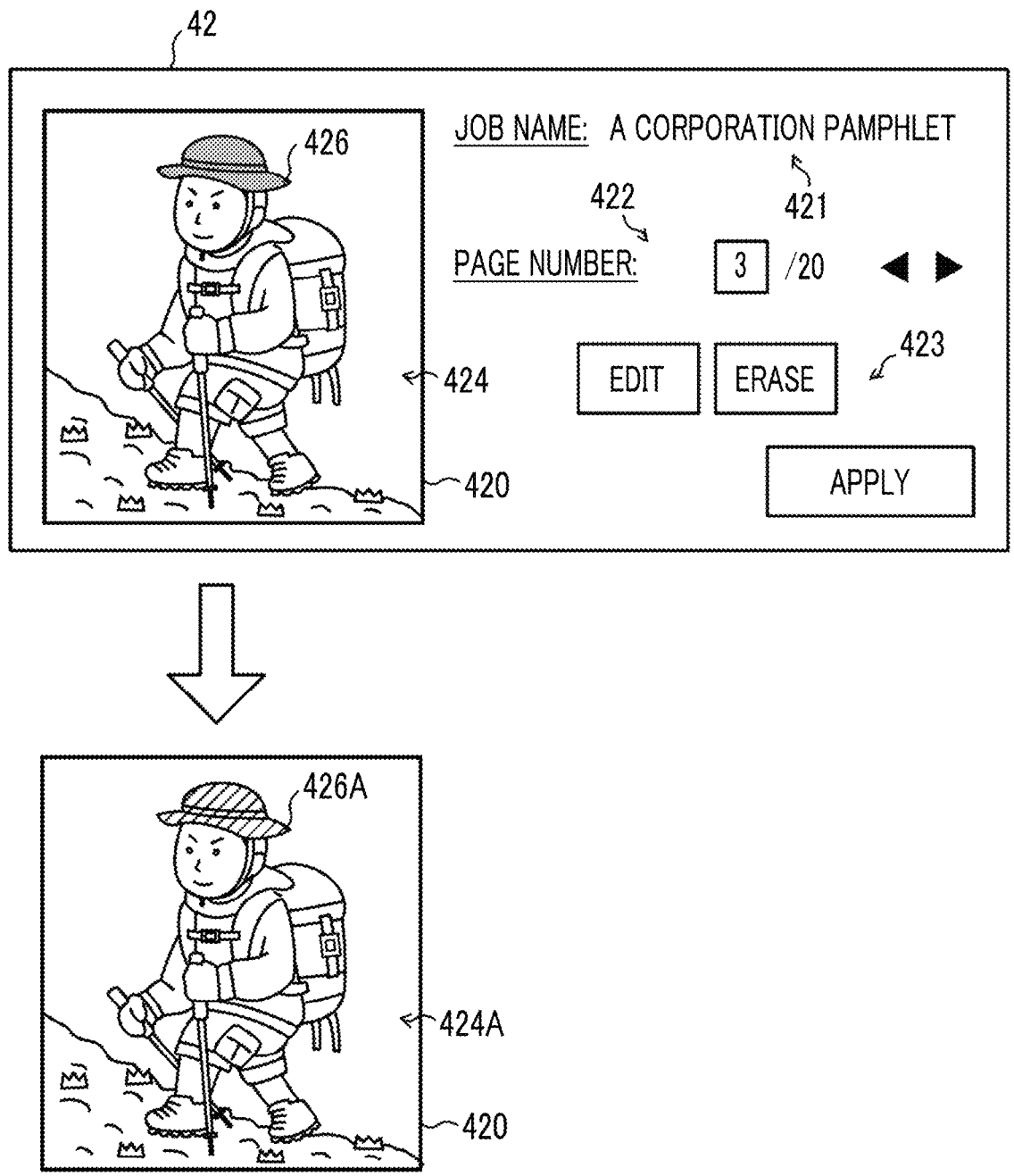
FIG. 7 is a diagram showing an example of a confirmation screen for a print setting.

FIG. 7 is a diagram showing an example of a confirmation screen for the print setting in the execution side terminal 40. In a case in which the instruction button 412 on the reprint instruction screen 41 shown in FIG. 6 is pressed, the confirmation screen shown in FIG. 7 is displayed. In FIG. 7, as an example of the confirmation screen, a confirmation and correction screen 42 when the image quality of a part of a printed image in the print setting is changed is shown for each page of the printed material.

The confirmation and correction screen 42 includes a display region 420 of a captured image 424 of the printed material, a display region 421 of a print job name, a display region 422 of a page position of the printed material, and a display region 423 related to the instruction of the confirmation and correction of the image. The captured image 424 displayed in the display region 420 is an image in which at least a part of the captured image can be corrected in accordance with the instruction of the executor. The captured image 424 is generated by the capture data for each page by using the scan data obtained by scanning, by the image reading device (not shown), the printed material printed in accordance with the set print setting.

The print job name displayed in the display region 421 is the information indicating the print job. The page position of the printed material displayed in the display region 422 is a position in the printed material corresponding to the captured image 424 displayed on the confirmation and correction screen 42. An image related to the instruction of the confirmation and correction of the image, which is displayed in the display region 423, includes an instruction button for performing a correction instruction with respect to the captured image 424. In the example shown in FIG. 7, an edit button, an erase button, and an apply button are provided. The edit button is an instruction button for instructing editing of at least a partial image of the captured image 424. The erase button is an instruction button for instructing erasing of at least a partial image of the captured image 424. The apply button is an instruction button for instructing applying of the result of the confirmation and correction.

The executor confirms the captured image 424 and performs the correction instruction with respect to the captured image 424 in a case in which a determination is made to change the print setting. For example, in a case in which the print setting in which color or hue can be set is considered when the executor confirms the captured image 424, the correction instruction is performed with respect to the captured image 424. In the example shown in FIG. 7, an image 426 of a hat in the captured image 424 is shown as an editing target, and an image in which the print setting is changed, that is, an edited captured image in which a part of the captured image 424 is edited is shown as a captured image 424A. In the example shown in FIG. 7, a message indicating "color of hat on page 3 of printed material is strange" shown in FIG. 6 is the reason why the print setting is changed.

FIG. 8 is a diagram showing an example of the confirmation screen for the print setting in the execution side terminal 40. FIG. 8 shows a job property editing screen 44 for editing a property related to the print setting as an example of a screen for changing the print setting of the print processing. The screen 44 shows information indicating various print settings which can be processed at the time of the print by the printer. By changing these various print settings, the print setting related to the image, such as color or hue, can be adjusted.

Next, the setting change of the print processing will be described with the processing performed in the application configuration (FIG. 2) of the information processing system 10 as an example.

FIG. 9 is a diagram showing an example of a flow of the information processing related to the setting change of the print processing in the information processing apparatus 20. FIG. 10 is a diagram showing an example of a flow of the processing related to the reprint instruction will be described focusing on the processing in the execution side terminal 40 and the first print server 24, regarding the setting change of the print processing.

In accordance with the access from the execution side terminal 40, the execution side terminal 40, the workflow server 22, the first print server 24, and the second print server 26 execute the processing shown in FIG. 9.

First, for confirmation of the printed material, the execution side terminal 40 is accessed by the operation of the executor (step S200). As a result of the confirmation by the executor, when a determination is made to change a part of the print setting and perform the reprint, the information indicating the reprint instruction is transmitted from the execution side terminal 40 to the first print server 24 and the workflow server 22 (steps S202 and S204).

As shown in FIG. 10, the first print server 24 receives the reprint instruction from the execution side terminal 40, and performs reprint correspondence processing. Specifically, the execution side terminal 40 requests the first print server 24 to transmit thumbnail data (image data) of the scan data of the printed material (step S2021).

The first print server 24 creates the thumbnail data (image data) of the scan data of the printed material (step S2022) and transmits the created thumbnail data to the execution side terminal 40 (step S2023). The execution side terminal 40 acquires the thumbnail data and presents the acquired thumbnail data to the executor as a thumbnail image.

In the presented thumbnail image, a changed portion (position) is entered by the executor. In the execution side terminal 40, the data of the thumbnail image in which the changed portion (position) is entered is acquired as the capture data. In addition, the information indicating the print setting with respect to the changed portion is also input. The execution side terminal 40 acquires the changed portion (position and capture data) in the thumbnail image entered by the executor and the information indicating the print setting with respect to the changed portion (step S2024). Further, the execution side terminal 40 acquires the information indicating the reason why the print setting is changed by the executor (step S2025). Then, the execution side terminal 40 executes setting transmission processing of transmitting, to the first print server 24, the changed portion (position) and the information indicating the print setting with respect to the changed portion (step S2026).

In a case in which the first print server 24 acquires the information from the execution side terminal 40, the first print server 24 performs processing of extracting a change difference related to the print setting (step S2027). This processing is setting change difference extraction processing of extracting the information indicating a difference between the print settings (setting change difference) before and after the reprint instruction. Further, the execution side terminal 40 executes processing of transmitting the information indicating the reprint instruction to the workflow server 22 (step S204).

After the above-described reprint correspondence processing, as shown in FIG. 9, the first print server 24 transmits, to the workflow server 22, the information indicating the changed portion in the thumbnail image entered by the executor including the capture data acquired from the execution side terminal 40 (step S206). Also, the first print server 24 transmits the information indicating the setting change difference (step S210). Then, the first print server 24 transmits the information indicating that the reprint instruction has been received as a response to the execution side terminal 40 (step S214).

The workflow server 22 registers the capture data transmitted from the first print server 24 in the database 250D (step S208). In addition, the workflow server 22 registers the information indicating the setting change difference transmitted from the first print server 24 in the database 250D (step S212).

Note that in step S212, the print setting of the print job that is the instruction target of the reprint is registered in the database 250D in association with the information indicating the setting change difference. As a result, the difference between the print settings before and after the change at the time of reprint instruction can be confirmed by referring to the database 250D.

In a case in which the registration processing of the capture data and the information indicating the setting change difference ends, the workflow server 22 performs reset processing (rescheduling) of a print schedule of the print job in order to process the print job in accordance with the reprint instruction from the execution side terminal 40. Specifically, the workflow server 22 performs processing of creating the print schedule that enables the print in accordance with the reprint instruction from the execution side terminal 40. For example, the workflow server 22 set a printer that can perform the print by the reprint destination target at the instructed print timing and notifies the corresponding print server (step S216). The example shown in FIG. 9 shows a case in which the second printer 27 having the same configuration as the first printer 25 is set as a printer that is a reprint target and the second print server 26 is notified. Further, the workflow server 22 instructs the execution of the reprint with respect to the print job for the reprint to which the information indicating the setting change difference registered in the database 250D is applied (step S218).

As described above, after the reset processing (rescheduling) of the print schedule of the print job, that is, the reprint setting ends, the workflow server 22 performs processing of reprint schedule completion response (step S220). In the processing of the reprint schedule completion response, the information indicating that the reprint setting has ended is transmitted as a response to the execution side terminal 40 with respect to the received reprint instruction.

FIG. 11 is a diagram showing an example of a display screen on which the print job processed by the first print server 24 is displayed. Note that as in the example shown in FIG. 9, in a case in which the print processing is performed by a printer other than the designated printer, the information indicating that the print processing is performed by the printer other than the designated printer need only be displayed. The display screen shown in FIG. 11 shows a form in which the information indicating that the print job has been reprinted is displayed independently of the display of the processed print job. As a result, at least the executor can intuitively grasp that the reprinted print job is present.

Creation of New Job by Using Setting of Existing Print Job

Next, the information processing when an instruction for the new print job is given by the instructor by using the existing print job will be described.

In a case in which the new print job is created by using the existing print job, that is, the print job is created by using the print setting of the print processing in the print process registered in the database 250D, the above-described change of the print setting made by the executor may not be made. In this case, a situation, such as a defect, that occurs in the print process of the existing print job reoccurs, and the reprint by the executor occurs again. In the present exemplary embodiment, the occurrence of the reprint again by the executor is suppressed.

In a case in which the new print job is created by using the existing print job, the collation result indicates the print job by using the existing print job is obtained in step S102 shown in FIG. 5, a negative determination is made in step S104, and the processing proceeds to step S106. For example, in a case in which the print setting of the print process in the created print job is registered in the database 250D as the print setting in the existing print job, a negative determination is made in step S104, and the processing proceeds to step S106.

In step S106, display control of the collation result is performed, and in a case in which the display control ends, the processing proceeds to step S108. Specifically, control of displaying the print setting of the print process in the print job registered in the database 250D on the instruction side terminal 30 is performed. As a result, the instructor can confirm the print setting in the existing print job. Further, in step S106, in a case in which there is a possibility that the print setting is changed and the reprint is performed in the existing print job, control of displaying the information regarding the reprint on the instruction side terminal 30 is also performed.

Figure 12:
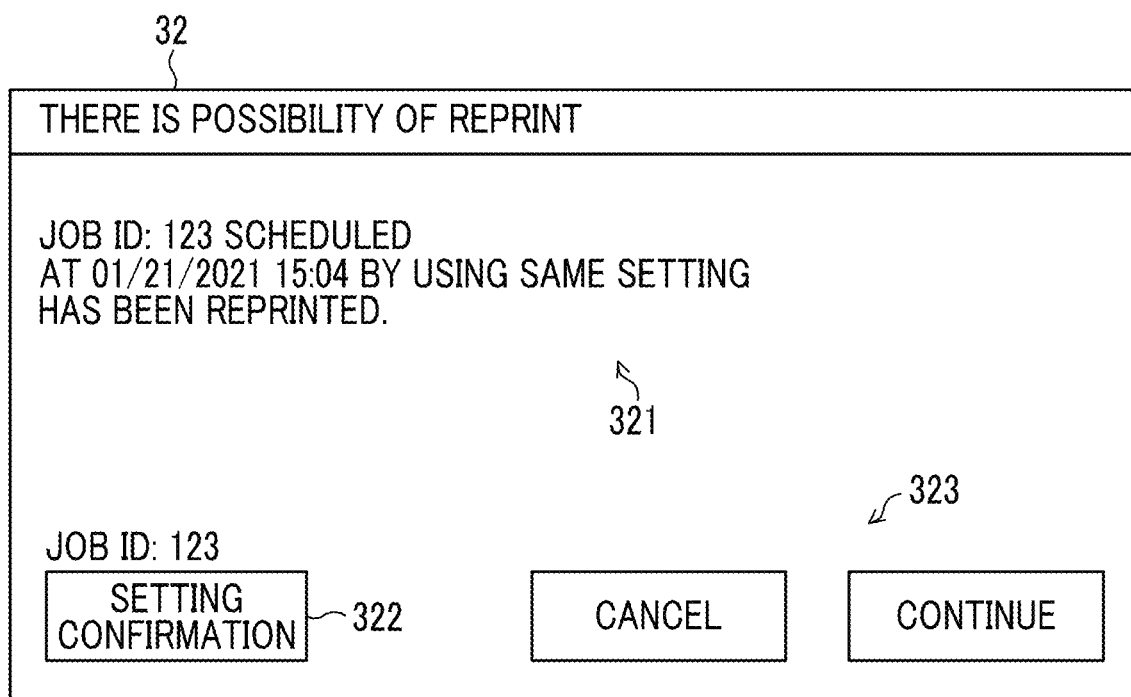
FIG. 12 is a diagram showing an example of a display screen on which information regarding the print job is displayed.

FIG. 12 shows a display screen 32 as an example of a screen displayed on the instruction side terminal 30 in a case in which there is the possibility that the print setting is changed and the reprint is performed in the existing print job used for the creation.

As shown in FIG. 12, the display screen 32 includes a display region 321 in which the information regarding the reprinted print job is displayed. In the example shown in FIG. 12, as the information regarding the reprinted print job, a job ID for identifying the print job, the print timing, and information indicating that the print setting is the identical print setting are provided. Further, the display screen 32 includes an instruction button 322 for confirming the setting and an instruction button 323 for continuing the processing. The instruction button 323 includes an instruction button for instructing continuing of the processing of creating the instruction document and an instruction button for canceling.

The instruction button 322 is an instruction button for instructing the confirmation of the print setting in the existing print job used for creation. By pressing the instruction button 322, control of displaying the print setting in the existing print job used for creation on the instruction side terminal 30 is performed.

Figure 13:
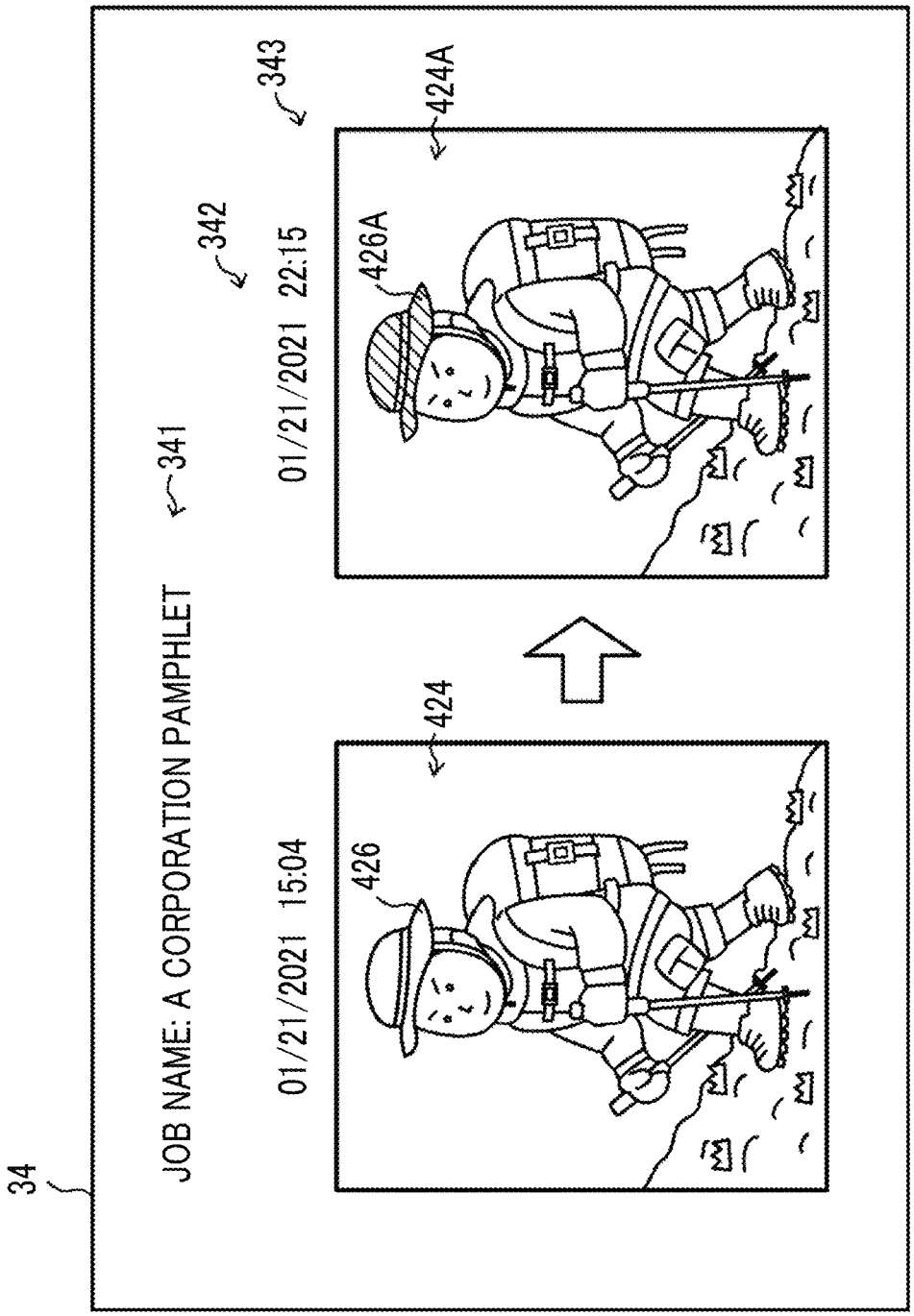
FIG. 13 is a diagram showing an example of a display screen on which information indicating the print setting is displayed.

FIG. 13 shows a display screen 34 on which the information regarding the print setting in the existing print job used for the creation is displayed on the instruction side terminal 30. The display screen 34 shown in FIG. 13 is an example of a screen including the print setting in the existing print job displayed on the instruction side terminal 30 by pressing the instruction button 322.

As shown in FIG. 13, the display screen 34 includes a display region in which the information regarding the print setting in the existing print job is displayed. Specifically, the display screen 34 includes a display region 341 of the print job name, a display region 342 of the print timing, and a display region 343 of the captured image of the printed material. In each of the display regions 342 and 343, control of displaying the information at the time of initial print and the information at the time of the reprint is performed for the existing print job. That is, the pieces of information indicating the print settings before and after the change at the time of the reprint instruction are registered in association with each other in the database 250D. Therefore, the pieces of information indicating the print settings before and after the change at the time of the reprint instruction can be acquired by referring to the database 250D. In the example shown in FIG. 13, a case is shown in which the captured image 424 of the printed material including the image 426 of the hat before the reprint instruction and the captured image 424A including an image 426A of the hat at the time of the reprint instruction are displayed corresponding to the print timing.

By performing control of displaying the print settings before and after the change at the time of the reprint instruction in this way, the instructor can confirm the changed print setting at the time of the reprint in a case in which the existing print job is used. Therefore, even in a case of the print job in which the print setting is changed by the reprint, the print job can be created in consideration of the changed print setting.

Note that although not shown, the display screen 34 can display the information indicating the reason why the print setting is changed by the executor. As a result, at least the instructor can confirm the reason why the reprint is performed. Also, a button for instructing the use of the print setting at the time of the reprint instruction instead of the print setting of the existing print job can be displayed on the display screen 32. As a result, the print setting designated by the executor at the time of the reprint can be used for the new job.

As described above, according to the present exemplary embodiment, the information indicating the changed print setting at the time of the reprint is registered by registering the print settings before and after the change at the time of the reprint instruction in association with each other in the database 250D. In a case in which the existing print job is used, by acquiring the registered print settings before and after the change at the time of the reprint instruction and presenting the acquired print settings to the worker side, the print setting changed at the time of the reprint can be confirmed. Therefore, even in a case of the print job in which the print setting is changed by the reprint, the print job can be created in consideration of the changed print setting. Therefore, when an instruction for the execution of the new print job is given by using an existing print job, the print setting changed to a print setting from the set print setting in the existing print job can be confirmed, and the creation of the printed material different from the assumption can be suppressed.

In the above-described exemplary embodiment, the case has been described in which each of one instruction side terminal 30 and one execution side terminal 40 is provided, but the technique of the present disclosure is not limited to this, and a configuration may be adopted in which a plurality of terminals of at least one of the instruction side terminal 30 or the execution side terminal 40 are provided. Further, the case has been described in which the first printer 25 is connected to the first print server 24 and the second printer 27 is connected to the second print server 26, but the technique of the present disclosure is not limited to this. For example, a configuration may be adopted in which at least one print server of the first print server 24 or the second print server 26 is connected to a plurality of printers. In addition, the print server is not limited to the first print server 24 and the second print server 26, and may be three or more.

Further, in the above-described exemplary embodiment, the print job executed in accordance with the workflow has been described as an example, but the technique of the present disclosure is not limited to this. For example, in a case in which the print processing is executed by designating the print processing and the print setting related to the print processing, when the setting is changed from the first print setting to the second print setting, the first print setting and the second print setting are stored. Then, a configuration may be adopted in which when the instruction or control of using the stored first print setting for another print processing is performed, the first print setting and the second print setting are displayed in association with each other. Further, the job executed in accordance with the workflow may include only the print process, or may be applied to another process.

Other Exemplary Embodiments

The description has been made above with the information processing apparatus according to the exemplary embodiment as an example. The exemplary embodiment may be in the form of the program that causes the computer to execute the function of each unit provided in the information processing apparatus. The exemplary embodiment may be in the form of a storage medium that can be read by the computer that stores the program.

In addition, the configuration of the information processing apparatus described in the above-described exemplary embodiment is an example, and may be changed depending on the situation within a range that does not deviate from the gist.

Further, the flow of the processing of the program described in the above-described exemplary embodiment is also an example, and unnecessary processes may be deleted, new processes may be added, or the processing order may be changed within a range that does not deviate from the gist.

Further, in the above-described exemplary embodiment, the case has been described in which the processing according to the exemplary embodiment is realized by a software configuration by using the computer by executing the program, but the technique of the present disclosure is not limited to this. The exemplary embodiment may be realized by, for example, a hardware configuration or a combination of the hardware configuration and the software configuration.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
store an instruction to execute a first job by using a first setting;
in a case in which the first setting is changed to a second setting different from the first setting when the first job is executed, store first setting information regarding the first setting and second setting information regarding the second setting in association with each other in a storage unit; and
in a case in which an instruction for execution of a second job different from the first job is given by using the first setting of the first job, perform control to display the first setting and the second setting, which are stored in the storage unit, in association with each other.

2. The information processing apparatus according to claim 1, wherein the processor is configured to:
in a case in which a setting of predetermined processing among the plurality of pieces of processing is changed from the first setting to the second setting different from the first setting when a job in which a plurality of pieces of processing to be executed in accordance with each setting are executed in set order is executed as the first job, store the first setting information regarding the first setting and the second setting information regarding the second setting in association with each other in the storage unit; and
in a case in which an instruction for the execution of the second job different from the first job is given by using the first setting, perform control to display the first setting and the second setting, which are stored in the storage unit, in association with each other.

3. The information processing apparatus according to claim 2, wherein the processor is configured to:
in a case in which the job is a job that includes a plurality of processes to be executed in accordance with a setting related to each processing, the job being executed in accordance with workflow information, which defines order of the plurality of processes, stored in the storage unit, and a setting of predetermined processing in a predetermined process among the plurality of processes is changed from the first setting to the second setting different from the first setting, store the first setting information regarding the first setting and the second setting information regarding the second setting in association with information indicating the predetermined process defined in the workflow information in the storage unit; and
in a case in which an instruction for the execution of the second job different from the first job is given by using the workflow information stored in the storage unit, perform control to display the first setting and the second setting in association with the predetermined process defined in the workflow information.

4. The information processing apparatus according to claim 3,
wherein the predetermined process is a print process of printing a printed material, and
the first setting and the second setting are print settings related to print of the printed material in the print process.

5. The information processing apparatus according to claim 4,
wherein the print process includes reading processing of reading the printed material manufactured in the print process as an image, and
the first setting information and the second setting information include read information obtained by reading the printed material printed in the print process.

6. The information processing apparatus according to claim 5,
wherein the second setting information includes information indicating a reason why the first setting is changed to the second setting.

7. The information processing apparatus according to claim 2,
wherein the second setting information includes information indicating a reason why the first setting is changed to the second setting.

8. The information processing apparatus according to claim 3, wherein the second setting information includes information indicating a reason why the first setting is changed to the second setting.

9. The information processing apparatus according to claim 4,
wherein the second setting information includes information indicating a reason why the first setting is changed to the second setting.

10. The information processing apparatus according to claim 1, wherein the processor is configured to:
in a case in which the first job is a first print job in which print processing is performed in accordance with a print setting, and the first print processing is executed by changing the first print setting to a second print setting different from the first print setting, which indicates the second setting, when first print processing is executed in accordance with a first print setting indicating the first setting, store first print setting information regarding the first print setting as the first setting and second print setting information regarding the second print setting as the second setting in association with each other in the storage unit; and
in a case in which an instruction for execution of a second print job different from the first print job is given by using the first print setting of the first print job, perform control to display the first print setting and the second print setting, which are stored in the storage unit, in association with each other.

11. The information processing apparatus according to claim 10,
wherein the second setting information includes information indicating a reason why the first setting is changed to the second setting.

12. The information processing apparatus according to claim 1,
wherein the second setting information includes information indicating a reason why the first setting is changed to the second setting.

13. A non-transitory computer readable medium storing an information processing program causing a processor to execute a process comprising:
storing an instruction to execute a first job by using a first setting;
storing, in a case in which the first setting is changed to a second setting different from the first setting when the first job is executed, first setting information regarding the first setting and second setting information regarding the second setting in association with each other in a storage unit; and
performing control, in a case in which an instruction for execution of a second job different from the first job is given by using the first setting of the first job, to display the first setting and the second setting, which are stored in the storage unit, in association with each other.

14. An information processing method comprising:
storing an instruction to execute a first job by using a first setting;
storing, in a case in which the first setting is changed to a second setting different from the first setting when the first job is executed, first setting information regarding the first setting and second setting information regarding the second setting in association with each other in a storage unit; and
performing control, in a case in which an instruction for execution of a second job different from the first job is given by using the first setting of the first job, to display the first setting and the second setting, which are stored in the storage unit, in association with each other.

* * * * *